United States Patent [19]
Rochester, Jr.

[11] 4,043,275
[45] Aug. 23, 1977

[54] CHAIN LENGTH ADJUSTER AND LOCKING DEVICE

[76] Inventor: William L. Rochester, Jr., P.O. Box 127, Aberdeen, N.C. 28315

[21] Appl. No.: 637,128

[22] Filed: Dec. 3, 1975

[51] Int. Cl.² .................... B61D 45/00; B61D 49/00; F16G 15/04; F16G 15/14
[52] U.S. Cl. ................ 105/477; 24/116 R; 105/469
[58] Field of Search .......... 24/116 R; 105/368 T, 105/465, 466, 469, 471, 473, 477

[56] References Cited

U.S. PATENT DOCUMENTS

| | | | |
|---|---|---|---|
| 1,280,163 | 10/1918 | Clarkson | 24/116 R |
| 1,531,770 | 3/1925 | Walker | 24/116 R |
| 2,387,509 | 10/1945 | Harris | 24/116 R |
| 2,539,997 | 1/1951 | Graves | 105/469 X |
| 3,027,615 | 4/1962 | Forney | 24/116 R |
| 3,041,027 | 6/1962 | McDowell | 105/368 T |
| 3,545,200 | 12/1970 | Fagan | 24/116 R X |

Primary Examiner—Robert J. Spar
Assistant Examiner—Howard Beltran
Attorney, Agent, or Firm—George H. Mitchell, Jr.

[57] ABSTRACT

To facilitate adjusting the length of a heavy cargo hold-down chain on a transport vehicle and for positively and safely locking the chain after adjustment, a pair of identical slotted plates are employed in reverse overlapping relationship and are detachably secured by releasable fastener means with chain links captured in their slots. The cooperating plate elements are formed to transmit chain tension on a straight linear axis with the releasable fastener means subjected to shearing stresses rather than to bending stresses.

9 Claims, 6 Drawing Figures

CHAIN LENGTH ADJUSTER AND LOCKING DEVICE

BACKGROUND OF THE INVENTION

The transportation of heavy cargo by truck, railway or by ships necessitates the use of reliable, safe and very strong lashing or hold-down means to prevent shifting of the cargo. Link chains are commonly employed for this purpose. Corresponding ends of cargo lashing chains of equal lengths are customarily permanently secured near one side of the cargo bed on a transport vehicle and the other chain ends are releasably secured by a variety of chain tightening devices at points near opposite sides of the cargo bed after the chains are looped over the cargo units whose heights and sizes will vary greatly.

As a consequence of cargo size variation, it is necessary to provide in each lashing chain a length adjusting and chain link locking means so that each chain before final tightening may be readily provided with a relatively large or relatively small slack loop or length adjustment loop between the cargo unit and one end of the lashing chain. The provision of such a length adjusting and locking means allows cargo lashing chains of equal lengths to be employed for practically all sizes of cargo on a railroad car, truck or the like.

It is therefore the object of the present invention to provide a chain length adjusting and locking means of the above character which is positive in its locking action and entirely safe or secure in the sense that it is impossible for the engaged and imprisoned links to become dislodged from the adjusting and locking device under any circumstances except when the two cooperating identical plate elements employed in the invention are intentionally separated by removal of their fastening means at proper times.

A further object of the invention is to provide a chain length adjuster and lock which is characterized by extreme simplicity and low manufacturing cost.

Another object is to provide in a device of the above-mentioned type means which allow the cargo lashing chain to transmit tension forces along a straight linear axis without subjecting the adjusting and locking device to twisting or bending and to impart substantially pure shearing stresses only to the removable pin means which connects the two identical plate elements of the device.

Other features and advantages of the invention will become apparent during the course of the following detailed description.

Some prior art patented devices for adjusting chains and locking them through engagement with selected chain links are shown in U.S. Pat. Nos. 1,280,163; 1,531,770; 2,387,509; 3,027,615; and 3,545,200. Generally speaking, the prior art devices in contrast to the present invention are a good deal more complex and costly, involve a greater number of parts, and do not completely eliminate the possibility, under certain circumstances, of separation of the engaged chain links from the locking or holding means. The invention is thought to be a significant improvement over all known prior art devices in terms of economy, safety and security, as well as ease of manipulation of the involved parts.

DETAILED DESCRIPTION

Figure 1:
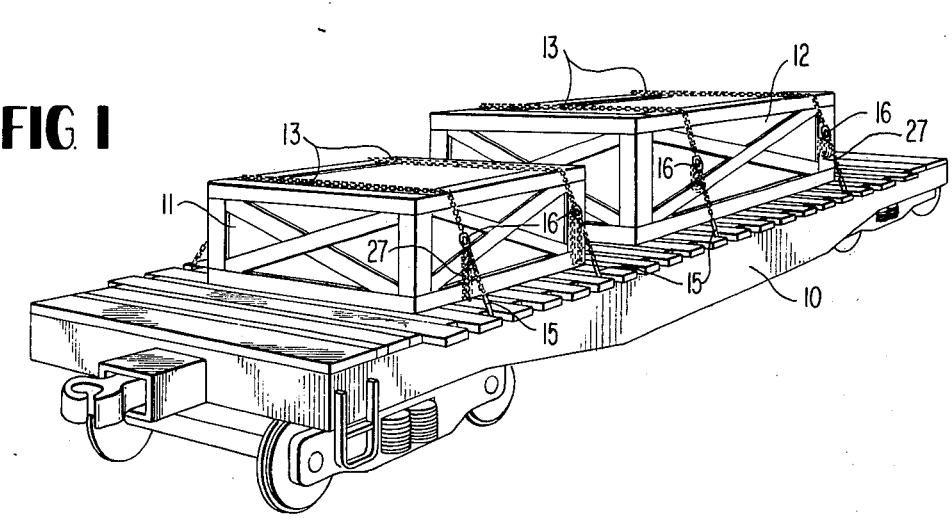
FIG. 1 is a perspective view of a cargo transport vehicle and cargo lashing chains and illustrating the application of the invention to the chains.
Figure 2:
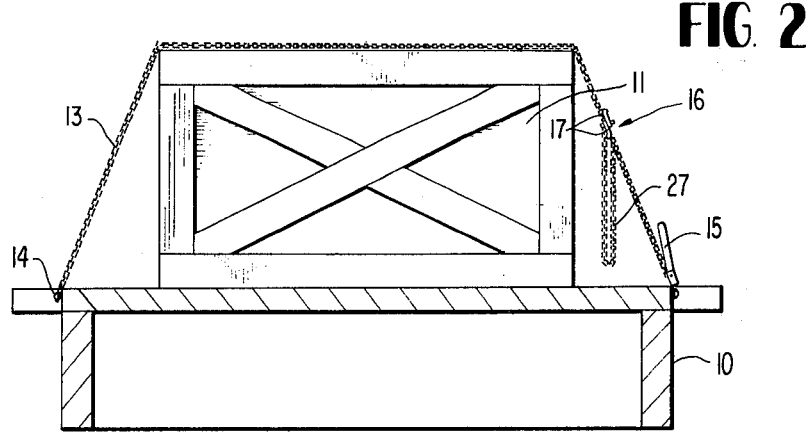
FIG. 2 is a partly schematic transverse cross sectional view taken through the vehicle of FIG. 1 and depicting the invention in relation to a cargo unit of one size.
Figure 3:
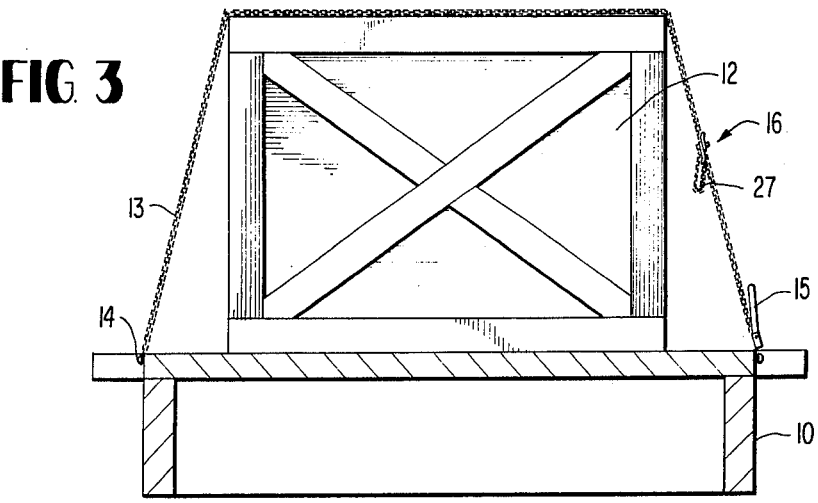
FIG. 3 is a similar view depicting the invention in relation to a cargo unit of a larger size.

Referring to the drawings in detail wherein like numerals designate like parts, the numeral 10 designates a railway car for transporting heavy cargo units 11 and 12 of different heights and sizes. In order to lash or tie-down these cargo units, a series of link chains 13 of equal lengths have corresponding ends 14 permanently attached by conventional means near one side of the transport vehicle bed. After proper length adjustment by means of the invention, yet to be described, the other ends of the chains 13 are secured detachably to the opposite side of the vehicle bed by conventional securing and tightening means 15 forming no part of this invention.

Before securing and tightening by the means 15, the chains 13 must be individually adjusted to a proper length for secure lashing of a cargo unit of any particular size which may happen to be on the transport vehicle at the time. After this length adjustment, the adjusting means must be positively and securely locked so that the chain cannot slip or become disengaged from the locking means. The invention herein, designated in its entirety by the numeral 16, is to satisfy these important purposes, and the invention will be described in detail in association with one cargo lashing chain 13 in connection with FIGS. 4 through 6.

Referring to these figures, it may be seen that the chain length adjusting and locking means 16 constituting the invention comprises a pair of identical rigid plate elements 17 which are essentially flat in their body portions and may taper toward a blunt or rounded end 18. Adjacent the ends 18, relatively short terminal portions 19 of the plate elements 17 are bent on transverse lines 20 to lie at angles to the planes of the main body portions of the two plate elements. As viewed in FIG. 4, the angles of the terminals 19 relative to the flat body portions of the plate elements 17 may be approximately 25°-30°. This angle is not extremely critical and may vary somewhat with chain link size and design.

Each plate element 17 is provided centrally in its broader end and at right angles to such end with a straight longitudinal slot 21 which terminates in a rounded end 22 substantially at the bending line 20. Each slot 21, therefore, extends substantially for the full length of the plate element flat body portion, and the terminal end portion 19 serves to integrally join the two sections of the plate element divided by the slot 21.

Each plate element 17 further has a pair of through openings 23 near and on opposite sides of the entrance end of slot 21 and spaced equidistantly laterally of the slot 21. The entrance to each slot 21 is formed by rounded corners 24 or shoulders, as shown. Preferably there are no sharp corners or edges on the plate element 17.

Figure 4:
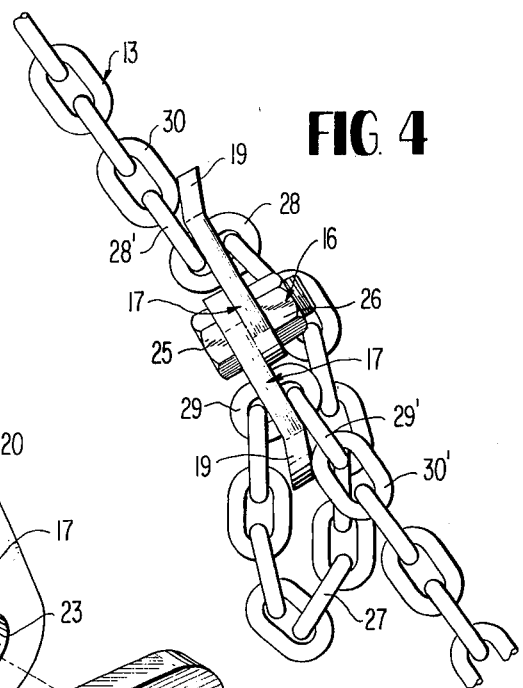
FIG. 4 is an enlarged fragmentary side elevation of a cargo lashing chain having the invention connected therein.
Figure 5:
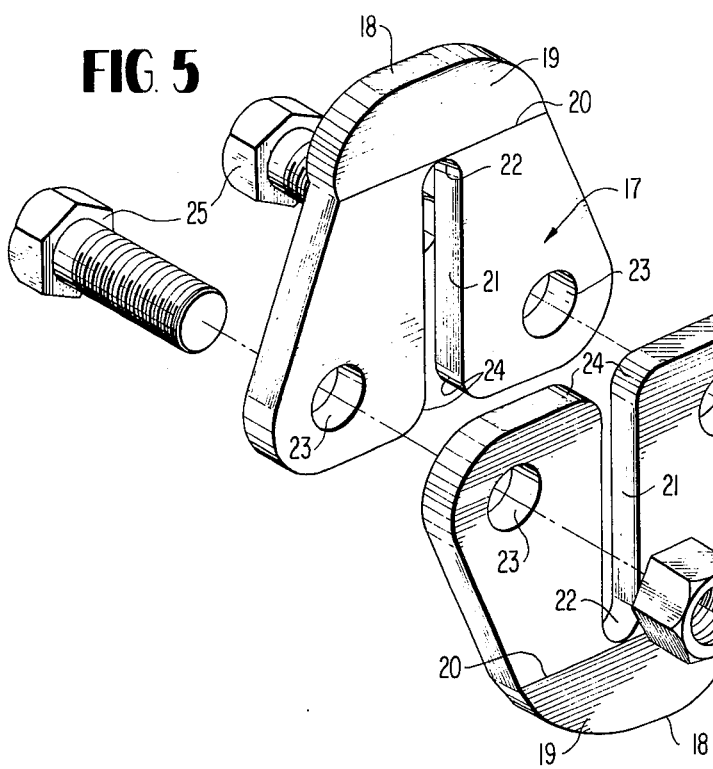
FIG. 5 is an exploded perspective view of the invention according to a first preferred form thereof.

Bolts 25 and cooperating nuts 26 are provided for rigidly and detachably securing the two identical plate elements 17 together in reversely directed overlapping relationship, FIG. 4, with their angled terminals 19 projecting in opposite directions away from the parallel planes of the flat plate body portions.

Referring particularly to FIG. 4, the mode of use and operation of the invention is clearly illustrated in connection with one of the cargo lashing chains 13, which is typical of any of the chains. When looping chain 30 over a cargo unit 11 or 12 or up to any size cargo unit which the length of chain 13 will accommodate, it is necessary to adjust and shorten the chain length sufficiently to allow the conventional securing and tightening means 15 to render the lashing chain taut and therefore effective. To do this, a slack loop 27 of relatively greater or lesser length must be formed in the continuous link chain, and the thusly shortened or adjusted chain must be securely locked in the proper length condition by the invention.

More particularly, the slack or idle loop 27 of proper length, FIG. 4, is formed manually in the chain 13 and one chain link 28 at one end of this slack loop 27 is engaged into the slot 21 of one plate element 17 before the two plate elements are connected by the bolts 25. The particular chain link 28 will have its opposite rounded ends projecting on opposite sides of the plate element 17, FIG. 4, and the straight parallel sides of the link will be normal to the flat plate element with one such straight link side bottoming in the end 22 of slot 21.

The second link 29 of the continuous chain 13 defining the other end of slack loop 27 is similarly engaged within the slot 21 of the oppositely facing plate element 17 before the plate elements are finally joined in overlapping relation, as depicted in FIG. 4 by the bolts 25 and nuts 26. It will be noted that the slack loop 27 extends away from the two locked links 28 and 29 from opposite sides of the assembly 16 or from the opposite exterior faces of the plate elements 17. The slack loop 27, after passing lengthwise over the assembly 16 in FIG. 4, passes around the straight portion of the chain 13 and back up to the under side of the assembly and to the locked link 29.

The two chain links 28' and 29' immediately beyond the locked links 28 and 29 are positioned in alignment along the axis of the taut chain 13 and the tension load on the chain is transmitted through the invention assembly on this axis and from opposite sides of the plate elements 17, as shown. The geometry is symmetrical and balanced, and the connecting bolts 25 are substantially in pure shear rather than being subjected to bending stresses. The oppositely angled terminals 19 provide clearance for the adjacent links 30 and 30' to enhance this balanced geometry and to prevent twisting of the assembly 16.

After coupling the plate elements 17 together rigidly by the bolt means, as shown, it is impossible for the locked links 28 and 29 to slip out of the slots 21 or for the slack loop 27 to change its length when tension is applied to the cargo lashing chain 13. The locked links 28 and 29 are prevented from moving lengthwise of the slots 21 by their closed ends 22 and by the adjacent ends of the lapped plate elements 17. They are prevented from moving at right angles to the plate elements by the next two adjacent chain links on opposite sides of the plate elements, as shown in FIG. 4. Only by removing the bolts 25 and separating the plate elements can the chain length adjustment be changed. Therefore, the invention possesses complete safety and security, is extremely strong and is very simple to manipulate or install and economical to manufacture. Its many advantages over the prior art should now be readily apparent. The identity of the two plate elements 17 also materially lessens manufacturing cost.

Figure 6:
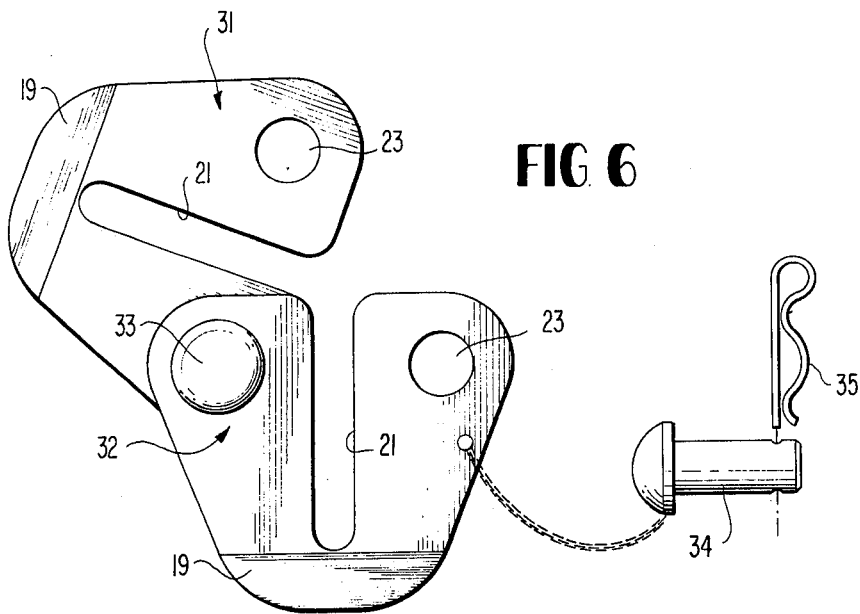
FIG. 6 is an elevational view showing a modification of the invention.

In FIG. 6, there is shown a modification of the invention wherein two plate elements 31 and 32 are constructed in the identical manner to the previously-described element 17 and function in the same way in relation to the chain 13 which is to be length adjusted and locked. In FIG. 6, however, the bolts 25 and nuts 26 are eliminated and the two plate elements are permanently pivotally connected in overlapping relation at a pair of the openings 23 by a suitable pin element 33. This has the advantage over the bolted arrangement that there are slightly fewer parts and the two main parts are permanently joined, thus lessening the likelihood of loss or misplacement. After the device is applied to the chain in the identical manner described previously, the two elements 31 and 32 are pivoted to a closed position where the slots 21 are in alignment and the second pair of openings 23 register to receive a captive pin element 34 on one plate element, said pin being releasably held in the use position through the openings 23 by a cotter key 35 or the like. The construction in FIG. 6 possesses the same advantages of security and safety and positive locking of the adjusted chain as were fully described in the previous embodiment.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A cargo lashing means comprising a length of link chain adapted to have one end anchored near one side of a cargo transporting base and adapted to have its other end releasably attached near the other side of the base by a conventional securing and tightening means, and a length adjusting and locking means for said chain allowing a slack loop of any necessary length to be formed in the chain between its ends and to be positively secured, said length adjusting and locking means comprising a pair of plate elements each having a slot formed therein extending inwardly from one marginal edge thereof and having an end terminating in the plate element, and fastener means releasably securing said plate elements in overlapping relationship with the slots of the plate elements in lateral registry the width of each slot being sufficient only to freely receive a respective link of said chain when inserted transversely into each slot, the presence of the adjacent links causing the links received in said slots to be immobilized against movement out of a respective slot in any direction when said plate elements are secured in said overlapping relationship.

2. The structure of claim 1, wherein said plate elements of said pair have angled terminal extensions beyond the closed ends of said slots and said angled extensions projecting in opposite directions from overlapped abutment faces of said plate elements and away from the axis of said chain.

3. The structure of claim 2, wherein said plate elements are identical in construction and are reversed end-for-end when secured in said overlapping relationship.

4. The structure of claim 1, and said fastener means comprising threaded bolt means extending through overlapped portions of said plate elements and being substantially normal to the plate elements.

5. The structure of claim 4, and said threaded bolt means consisting of a pair of bolts spaced equidistantly from opposite sides of said slots, the plate elements having pairs of apertures formed therethrough and adapted for registry to receive said bolts when the plate elements are overlapping.

6. The structure of claim 1, and said fastener means comprising a pivotal connection between said plate elements near corresponding sides thereof and at overlapping regions of the plate elements, and releasable pin means for securing additional overlapping regions of the plate elements fixedly when said slots of the plate elements are in registry.

7. A chain length adjuster and locking device comprising a pair of identically formed plate elements each having a straight slot formed through one edge thereof with said slot having a closed end within the plate element near the opposite end of the plate element, each plate element having a pair of apertures adapted to receive a chain link transversely therein on opposite sides of said slot and near said one end of the plate element, and fastener means for said plate elements engagable within said apertures when the apertures are in registration and with the plate elements in overlapping relation near said one end of each and with the slots of the plate elements in registration and longitudinal alignment, the plate elements then being reversed end-for-end so that the closed distal ends of said slots are laterally spaced from each other in the overlapping plate elements forming a single thickness unit, each plate element having an integral angles terminal extension near said opposite end thereof and beyond the closed end of said slot.

8. The structure of claim 7, and said fastener means comprising separable bolt means.

9. The structure of claim 7, and said fastener means including a pivotal connection through registering apertures of the plate elements, and a separable pin connection through additional registering apertures of the plate elements.

* * * * *